United States Patent
Pratt

[15] 3,656,051
[45] Apr. 11, 1972

[54] FAST RESPONSE FEEDBACK CONTROLLED GENERATOR

[72] Inventor: Aloysius W. Pratt, New Carlisle, Ohio
[73] Assignee: Kohler Co., Kohler, Wis.
[22] Filed: July 20, 1970
[21] Appl. No.: 59,775

[52] U.S. Cl. ..................322/28, 307/252 J, 321/18, 322/73, 323/22 SC
[51] Int. Cl. ..................................................H02p 9/30
[58] Field of Search..................322/28, 36, 59, 73, 86, 87, 322/88; 325/15, 16; 321/18; 323/22 SC; 307/252 R, 252 J

[56] References Cited

UNITED STATES PATENTS

| | | | |
|---|---|---|---|
| 3,273,041 | 9/1966 | Strohmeier et al. | 321/4 |
| 3,596,112 | 7/1971 | Nelson | 323/22 SC |
| 3,401,328 | 9/1968 | Hartung | 322/28 |
| 3,214,599 | 10/1965 | Wellford | 322/28 X |
| 3,132,297 | 5/1964 | Erikson | 322/59 |
| 2,748,340 | 5/1956 | Brunner et al. | 322/86 X |

Primary Examiner—Lewis H. Myers
Assistant Examiner—H. Huberfeld
Attorney—Arthur H. Seidel and Thomas O. Kloehn

[57] ABSTRACT

A power unit comprised of an alternator and exciter operating together to generate a controlled a-c voltage. The exciter armature and alternator field winding are rotated on a common shaft along with a current control circuit. The current control circuit contains four SCR's arranged in a full-wave bridge rectifier configuration. Their gates are controlled by a command signal and the SCR's conduct in pairs to alternately connect the exciter armature to the alternator field winding to directly control the magnitude of the alternator field current and to maintain the alternator output voltage at a predetermined level. A comparator circuit generates a train of pulses which constitute the command signal and control the firing of the SCR's. The timing, or phase relationship of these pulses is determined by the magnitude of the alternator output voltage. The command signal is conveyed from the stationary comparator circuit to the current control circuit by a transceiver comprised of a stationary primary winding and a rotating secondary winding, both wound concentric to the axis of shaft rotation.

11 Claims, 7 Drawing Figures

INVENTOR
ALOYSIUS W. PRATT

BY
ATTORNEY

Patented April 11, 1972

INVENTOR
ALOYSIUS W. PRATT

BY Arthur H. Seidel

ATTORNEY

Patented April 11, 1972

INVENTOR
ALOYSIUS W. PRATT

BY

ATTORNEY

Patented April 11, 1972

INVENTOR
ALOYSIUS W. PRATT

BY *Arthur H. Diddl*

ATTORNEY

FAST RESPONSE FEEDBACK CONTROLLED GENERATOR

BACKGROUND OF THE INVENTION

This invention relates generally to the art of generating a regulated a-c voltage by means of an alternator, or a-c generator, having a field winding wound on a shaft that is rotated by a diesel or gasoline engine. It is common practice to generate current for the alternator field winding by means of an exciter having an armature which is also wound on the rotating shaft. The exciter is generally an a-c generator and its output is rectified to supply d-c current for the alternator field winding. The power unit so formed requires no brushes or commutators between the stationary and rotating elements.

In feedback controlled power units the exciter field winding is stationary, and it is customary to control, or regulate the output voltage of the alternator armature by means of a feedback signal which controls the exciter field current. In an ideally controlled system, the variations in output voltage caused by changes in load current are instantaneously corrected by means of the feedback control system. However, it is well known to those skilled in the art that a control system having such an instantaneous response, or zero response time, cannot be made. More particularly, it is well known that the response time of the control system is substantially limited by the exciter and alternator time constants.

When a change is made in exciter field current, a finite and relatively large time interval elapses before the exciter armature output voltage responds properly to correct the alternator field current. This time period is an inherent feature of the exciter, due mainly to the large inductive reactance of both the exciter field and armature windings. Present feedback controlled generators include the exciter in the feedback loop, and the inherent time constant of the exciter is a substantial contributor to the long response time of the generator to variations in load current.

SUMMARY OF THE INVENTION

The invention contemplates a controlled generator which eliminates the exciter time constant by eliminating the exciter from the feedback system. More particularly, a preferred embodiment of the system may include an alternator having a field winding adapted for rotation on a shaft and a stationary armature which generates an output voltage the magnitude of which is controlled by the magnitude of the current in the field winding; an exciter having an armature which is also rotating on the shaft and generates an alternating voltage; a current control circuit attached to the rotating shaft and connected to receive the exciter armature voltage and to control the magnitude of the alternator field current to maintain the alternator output voltage at a predetermined level in response to a command signal, a comparator circuit connected to sense variations in the alternator output voltage and generate a command signal which contains the information necessary to maintain the alternator output constant; and a transceiver circuit connected to receive the command signal from the comparator and transmit it to the current control circuit attached to the rotating shaft.

The alternator armature and comparator circuit are stationary, and instead of using the command signal generated by the latter to control current in the stationary exciter field winding, the command signal controls the alternator field current through the current control circuit that is electrically located between the exciter armature and the alternator field. The transceiver accomplishes the transfer of the information contained in the command signal of the stationary comparator circuit to the rotating current control circuit.

A general objective of the invention is to provide an economical and reliable voltage generator which responds rapidly to voltage variations caused by changes in load current. The response time of the generator is substantially improved by controlling the alternator field current directly, thus excluding the exciter from the feedback control system.

A more specific objective of the invention is to provide a comparator circuit which senses the magnitude and direction of variations in the alternator output voltage, and generates a command signal which contains the information necessary to change the alternator field current and restore the output voltage to its predetermined level. The command signal contains this necessary information in the form of pulses which are readily transferred to the rotating shaft by means of the transceiver, and which are readily interpreted by the current control circuit.

Still another objective of the invention is to provide an inexpensive and reliable transceiver which will convey the command signal to the rotating shaft without distortion of the information contained therein irrespective of the shaft's rotary speed or orientation, and without the use of brushes or commutators.

The foregoing and other objects and advantages of the invention will appear from the following description. In the description reference is made to the accompanying drawings which form a part hereof, and in which there is shown by way of illustration and not of limitation a preferred embodiment of the invention. Such embodiment does not represent the full scope of the invention, but rather the invention may be employed in many different embodiments, and reference is made to the claims herein for interpreting the breadth of the invention.

DESCRIPTION OF THE PREFERRED EMBODIMENT

An alternator, or a-c generator, is mounted with, and shares a common rotatable shaft with a smaller a-c generator called an exciter. The exciter and alternator are combined to form a single unit with a drive means, usually a diesel or gasoline engine. There are numerous mechanical arrangements known to those skilled in the art for combining the alternator, exciter and drive means into a single power unit, and further discussion and description of these methods would only serve to detract from a clear disclosure of the invention.

Figure 1:
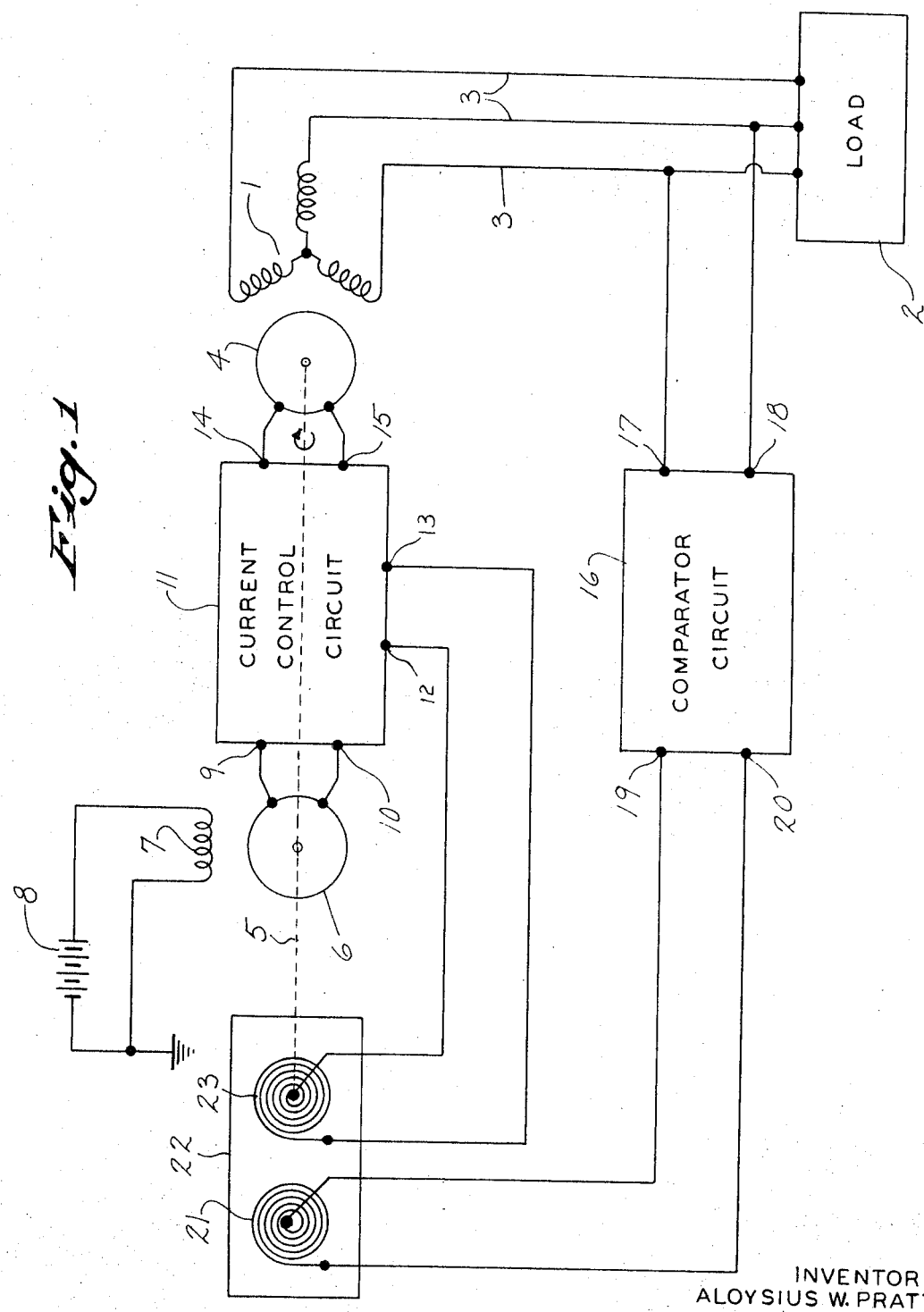
FIG. 1 is an electrical block diagram of a controlled fast response generator embodying the invention.

The invention concerns the electrical circuitry associated with the alternator and exciter which serves to control the output voltage of the power unit. Referring to the electrical block diagram in FIG. 1, an alternator armature 1 is connected to a load 2 by means of three output lines 3. The alternator armature 1 is a stationary winding which generates a three phase a-c voltage across the output lines 3. The magnitude of the a-c voltage generated by the armature 1 is determined by the magnitude of the current flowing in an alternator field winding 4, forming a part of the alternator and connected for rotation by a shaft 5, designated in FIG. 1 by a dashed line. There are, of course, other factors which determine the magnitude of the alternator armature output voltage, such as the speed of shaft rotation, however, it is intended that these parameters are substantially constant during the operation of the power unit, and only the field current is used to control alternator output voltage.

Current for the alternator field 4 is generated by an exciter armature 6, also driven by the shaft 5. The exciter armature 6 generates an a-c voltage when a current is supplied to its stationary exciter field winding 7. The exciter field current remains constant and is furnished by a battery 8 connected to the two terminals of the exciter field winding 7. It can be appreciated, by those skilled in the art, that the exciter field winding 7 and battery 8 can be replaced by a suitable permanent magnet.

The a-c output voltage of the exciter armature 6 is applied to input terminals 9 and 10 of a current control circuit 11. The current control circuit 11 also receives a command signal at two trigger terminals 12 and 13. The current control circuit 11 applies a voltage, to be hereinafter described, at two output terminals 14 and 15, which terminals connect directly to the alternator field winding 4. The voltage applied at output terminals 14 and 15 determine the magnitude of alternator field current, and consequently the alternator output voltage.

The command signal for the current control circuit 11 is generated by a comparator circuit 16. The comparator circuit 16 has two input terminals 17 and 18 connected to the alternator output lines 3 to sense the magnitude of one phase of the armature output voltage. The command signal is produced at two output terminals 19 and 20 of the comparator circuit 16. The signal contains the information needed by the current control circuit 11 to control the amount of alternator field current needed to maintain the alternator output voltage at a predetermined level.

The output terminals 19 and 20 are connected to a primary winding 21 in a transceiver 22. The primary winding 21 is stationary and magnetically linked with a secondary winding 23 attached to the shaft 5. The command signal appearing across the primary winding 21 is induced into the secondary winding 23, the latter being connected directly to the trigger terminals 12 and 13 of the current control circuit 11.

Figure 2:
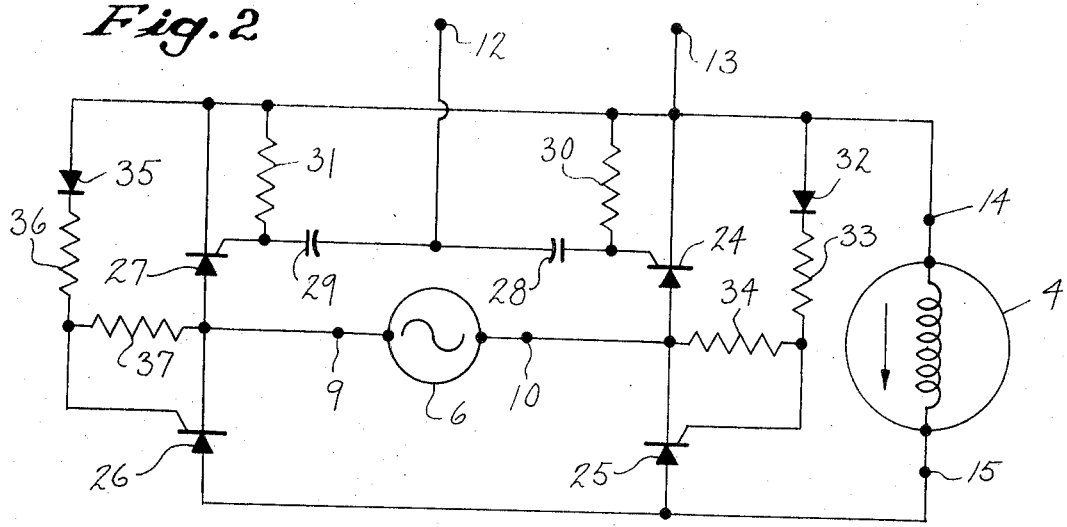
FIG. 2 is a schematic wiring diagram of a current control circuit which forms a part of the generator in FIG. 1.

Referring to FIG. 2, the current control circuit 11 has four semi-conductor controlled rectifiers (SCR) 24, 25, 26 and 27, connected in a full-wave bridge rectifier configuration. The anode of SCR 24 is connected to input terminal 10 and the cathode is connected to output terminal 14. The cathode of SCR 25 is connected to input terminal 10 and the anode is connected to output terminal 15. The cathode of SCR 26 is connected to input terminal 9 and its anode is connected to the output terminal 15. The anode of SCR 27 is connected to the input terminal 9 and its cathode is connected to the output terminal 14.

Trigger terminal 13 is connected directly to the output terminal 14. The other trigger terminal 12 connects to one lead of a first integrator capacitor 28 and one lead of a second integrator capacitor 29. The other lead of the first integrator capacitor 28 connects to the gate of SCR 24 and to one lead of a first integrator resistor 30. The other lead of the second integrator capacitor 29 connects to the gate of SCR 27 and to one lead of a second integrator resistor 31. The other leads on the first and second integrator resistors 30 and 31 connect to the trigger terminal 13. Also connected to the trigger terminal 13 is the anode of a first gating diode 32, the cathode of which is connected to one lead of a first gating resistor 33. The other lead of the first gating resistor 33 is connected to the gate of SCR 25 and to one lead of a first inhibit resistor 34. The other lead of the first inhibit resistor 34 is connected to the input terminal 10. Similarly, the anode of a second gating diode 35 is connected to the trigger terminal 13 and its cathode is connected to one lead of a second gating resistor 36. The other lead of the second gating resistor 36 is connected to the gate of SCR 26 and to one lead of a second inhibit resistor 37. The other lead of the second inhibit resistor 37 is connected to the input terminal 9.

The a-c exciter armature voltage is applied across the input terminals 9 and 10, and the command signal is applied to the trigger terminals 12 and 13 to fire the SCR's in a manner which controls the voltage produced at output terminals 14 and 15.

Figure 3:
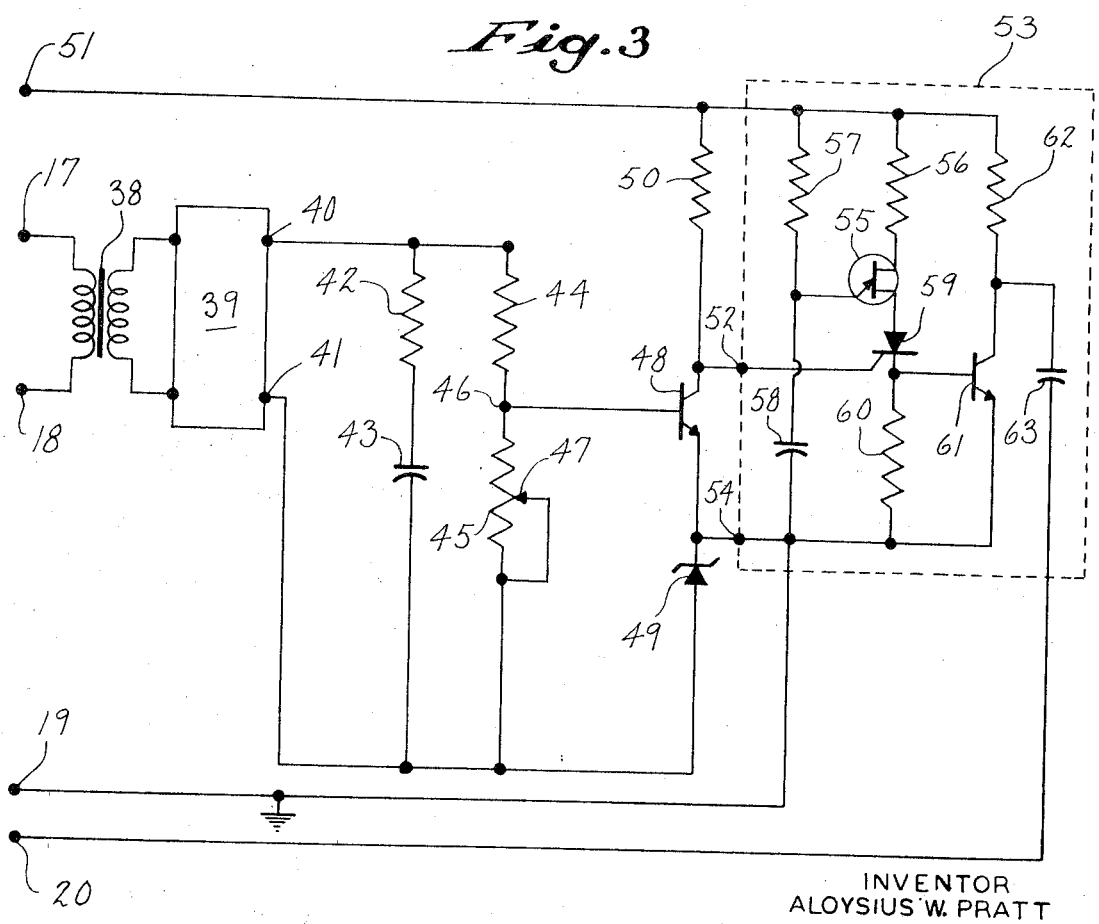
FIG. 3 is a schematic wiring diagram of a comparator circuit which forms a part of the generator in FIG. 1.

Referring to FIG. 3, the input terminals 17 and 18 of the comparator circuit 16 are connected directly to the primary winding of a step-down transformer 38. The secondary winding of the step-down transformer 38 is connected to the input terminals of a full-wave bridge rectifier unit 39. The bridge rectifier unit 39 is a standard item available in assorted power and voltage ratings and provides a fully rectified signal across its output terminals 40 and 41.

Connected across the rectifier output terminals 40 and 41 is a filter branch comprised of a filter resistor 42 in series with a filter capacitor 43. Also connected across the rectifier output terminals 40 and 41 is a voltage divider branch comprised of a drop resistor 44 and a potentiometer 45 connected in series. The point of connection of the drop resistor 44 and potentiometer 45 is a summing point 46. A slider 47 on the potentiometer 45 is connected to the rectifier output terminal 41.

The summing point 46 connects directly to the base of a switching transistor 48. The emitter of the switching transistor 48 connects to the cathode of a zener diode 49, the anode of which is connected to the rectifier output terminal 41. The collector of the switching transistor 48 connects through a load resistor 50 to a supply terminal 51. The supply terminal 51 is connected to the positive terminal of any readily available d-c power source, such as the battery 8 used to supply the exciter field winding 7. The negative terminal of the same power source is connected to the emitter of switching transistor 48. The collector of the switching transistor 48 is connected to the input terminal 52 of a pulse generator 53, designated generally in FIG. 3 by the dashed line. Also, the emitter of the switching transistor 48 connects to the comparator output terminal 19 and a second pulse generator input terminal 54.

Within the pulse generator 53 is a unijunction transistor 55 with its second base connected to the supply terminal 51 through a resistor 56. The emitter of the unijunction transistor 55 connects to the supply terminal 51 through a bias resistor 57, and connects to one lead of a charging capacitor 58. The other lead of the charging capacitor 58 connects to the second pulse generator input terminal 54. The first base of the unijunction transistor 55 connects to the anode of a switch SCR 59. The gate of the switch SCR 59 connects to the pulse generator input terminal 52, and its cathode connects to the second pulse generator input terminal 54 through a resistor 60. The cathode of the switch SCR 59 is also connected to the base of an NPN transistor 61. The emitter of he transistor 61 is connected to the second pulse generator input terminal 54 and its collector is connected to the supply terminal 51 through a collector resistor 62. Finally, a coupling capacitor 63 connects the collector of the transistor 61 to the comparator output terminal 20.

Figure 4:
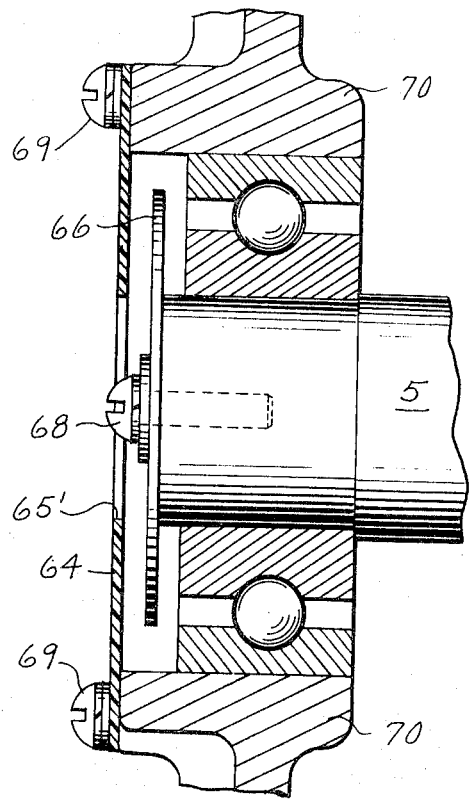
FIG. 4 is a view in cross section of a transceiver forming a part of the controlled generator.
Figure 5:
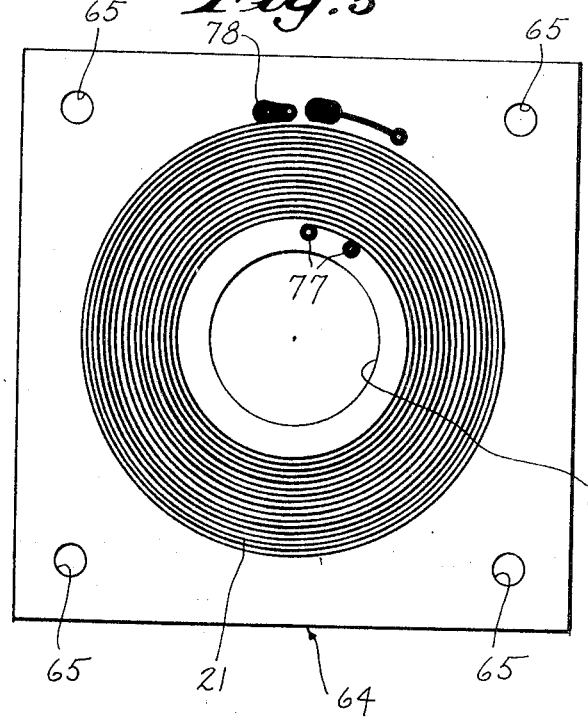
FIG. 5 is a view of the transceiver primary winding circuit board.
Figure 6:
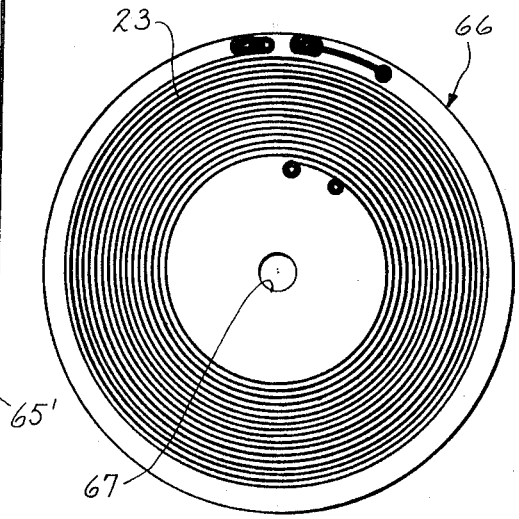
FIG. 6 is a view of the transceiver secondary winding circuit board.

The output terminals 19 and 20 of the comparator circuit 16 are connected to the stationary primary winding 21 in the transceiver 22. As shown in FIGS. 4, 5 and 6, the primary winding 21 is formed on a square shaped printed circuit board 64 having mounting holes 65 in each corner and a center hole 65'. The primary winding 21 consists of a conductive pad on one surface of the printed circuit board 64 spiralling about the center of the board. Likewise, the secondary winding 23 of the transceiver 22 is a spiral-shaped conductive pad on one surface of a disk-shaped printed circuit board 66 which has a central mounting hole 67. The secondary printed circuit board 66 is mounted by means of a bolt 68 to the end of the rotating shaft 5, concentric with the shaft's axis of rotation. The primary printed circuit board 64 is attached by means of bolts 69 to a portion of the stationary frame 70 with its printed surface aligned parallel to the printed surface of the secondary printed circuit board 66, and its center concentric with the axis of rotation of the shaft 5. The spacing between the primary and secondary printed circuit boards 64 and 66 is large enough to prevent contact between the two circuit boards under normal operating conditions, and close enough to allow reliable transfer of 1 kHz pulses from the primary winding 21 to the secondary winding 23.

OPERATION

The command signal generated by the comparator circuit 16, and used to actuate the current control circuit 11, is in the form of a short train of 1 kHz pulses. As will be explained below, the time relationship of the first pulse in each train with respect to the a-c voltage generated by the exciter armature 6 controls the alternator field current, and consequently, the voltage appearing at the alternator output lines 3.

Referring to FIG. 3, the 1 kHz pulses are generated in the comparator circuit 16 by the pulse generator 53, which is basically a unijunction relaxation oscillator, the operation of which is familiar to those skilled in the art. The frequency is determined by the values of bias resistor 57 and charging capacitor 58, and is chosen to be substantially higher than the 60 Hz frequency of the exciter and alternator. The switch SCR 59 is situated in the pulse generator 53 to interrupt operation when the SCR 59 is nonconductive. When it is conductive, however, a continuous train of pulses is generated to the base of the NPN transistor 61 which amplifies and applies the signal to the output terminals 19, 20, and hence to the primary winding 21 of the transceiver 22. In summary, a 1 kHz pulse train is delivered to the transceiver 22 when the switch SCR 59 is conductive, or "on".

The conductive state of the switch SCR 59 is controlled by the switching transistor 48. When the switching transistor 48 is nonconductive, or "off", there is little voltage drop across the load resistor 50 and the switch SCR 59 gate rises to a positive voltage which causes the switch SCR 59 to conduct. When the switching transistor 48 conducts, or turns "on", the collector current flowing through the load resistor 50 produces a large voltage drop which substantially lowers the positive SCR gate voltage, causing the switch SCR 59 to turn "off". Therefore, when the switching transistor 48 is "off" pulses are generated, and when the switching transistor 48 is "on" the pulse train is terminated.

The switching transistor 48 is controlled by the magnitude of the alternator output voltage appearing at the comparator input terminals 17 and 18. The applied alternator output voltage is reduced in magnitude by the step-down transformer 38 and rectified by the bridge rectifier unit 39. Referring to the waveforms in part (A) of FIG. 7, the alternator sinusoidal output is rectified, and such rectified waveform 71 appears across the rectifier output terminals 40 and 41. The filter resistor 42, filter capacitor 43, and the drop resistor 44 transform the rectified alternator waveform 71 into a pulsating d-c waveform 72. The pulsating d-c waveform 72 has a series of humps 73, roughly coincident with the peaks of the rectified alternator waveform 71, each followed and interconnected by a sloping ramp portion 74. The humps 73 are periodic increases in voltage produced by the addition of the filter resistor 42 to the circuit, and their purpose will become apparent from the discussion to follow. The ramp portions 74 of the waveform 72 are produced by the discharging of the filter capacitor 43, which occurs between the peaks of the rectified alternator voltage waveform 71.

The pulsating waveform 72 is applied to the base of switching transistor 48 and serves to control its conduction. To turn "on" switching transistor 48, base current must flow into it. Before base current will flow, however, the voltage of the applied waveform 72 must exceed the sum of the breakdown voltage of the zener diode 49 and the voltage necessary to forward bias the base-emitter junction of the switching transistor 48. This combined breakdown and bias voltage serves as a constant reference voltage 75, against which the voltage waveform 72 is compared. When the magnitude of the waveform 72 appearing on the base of switching transistor 48 exceeds the magnitude of the reference voltage 75, the switching transistor 48 conducts collector current and terminates the generation of pulses by the pulse generator 53. Conversely, when the waveform 72 falls beneath the constant reference voltage 75 the switching transistor 48 will be "off" and the pulse generator 53 will generate a train of pulses.

The waveform 72 rises and falls, with respect to the reference voltage 75 in response to the amplitude of the rectified alternator output voltage 71. If it be assumed for one condition of operation, that the alternator output voltage is such that a portion of the ramp 74 of waveform 72 is greater than the reference voltage 75, as indicated in part (A) of FIG. 7, then the hump 73 on the waveform 72 periodically stops the generation of pulses to the transceiver 22, and a new pulse train is initiated each time the ramp portion 74 of the waveform 72 crosses, or drops below, the reference waveform 75. The resulting pulse trains are as shown in part (B) of FIG. 7, wherein they are designated by the numeral 76. Because the height of the ramp portion 74 of waveform 72 varies with respect to the reference waveform 75 in response to the magnitude of the rectified waveform 71, the time interval between termination of one pulse train 76 and initiation of the next train 76 is determined by the voltage magnitude of the alternator armature 1. For example, when the alternator output voltage increases, the time interval which elapses between each hum 73 on waveform 72 and the point at which the subsequent ramp 74 crosses and descends beneath the reference waveform 75 increases. This, in turn, increases the time interval between pulse trains, and because the trains 76 occur at a fixed frequency which is the same as the alternator output frequency, shortens their duration. On the other hand, when the alternator output voltage drops, the ramp portion 74 of waveform 72 crosses the reference voltage 75 more promptly after termination of the previous pulse train 76, and the pulse trains 76 are now longer in time and more closely spaced to one another. In summary, the comparator circuit 16 generates a series of pulse trains 76 in which each pulse train 76 is terminated in synchronism with the peaks of the rectified alternator output voltage 71. The time interval elapsing between the termination of a pulse train 76 and the beginning of the subsequent pulse train 76 is determined by the magnitude of the alternator output voltage.

The pulse trains 76 are transmitted to the current control circuit 11, mounted on the rotating shaft 5, by means of the transceiver 22. Referring to FIGS. 4, 5 and 6, the output from the comparator circuit 16 is connected to terminal pads 77 and 78 on the primary printed circuit board 64. The magnetic field produced by a pulse train 76 flowing in the spiral-shaped primary winding 21, is substantially symmetric about the axis of rotation of the shaft 5, and links with the spiral-shaped secondary winding 23 on the printed circuit board 66. The secondary winding 23 is also substantially symmetric about the axis of shaft rotation, and receives the pulse train 76 by induction like a transformer secondary winding. The geometry of the primary and secondary windings 21 and 23 ensures conveyance of the pulse trains 76 across the air gap with little or no phase distortion irrespective of the orientation of the windings 21, 23 due to shaft rotation.

There are other possible winding configurations which will provide the same function. It is essentially only that the primary and secondary windings be wound substantially concentric about the axis of rotation of the shaft 5. For example, the primary and secondary windings 21 and 23 can he circular coils of wound wire mounted concentric with respect to the axis of rotation of the shaft 5 and spaced adjacent each other along the axis of rotation. Also, rather than being adjacent to one another, one winding may overlap, or surround, the other winding, as long as both are wound concentric with the axis of rotation of the shaft 5. It can be appreciated that other modes of transmitting the pulse trains 76 to the rotating circuits can be used. For example, the use of light to transmit the information can be used.

Referring now to FIG. 2, the pulse trains 76 transferred by the transceiver 22 are received at the trigger terminals 12, 13 of the current control circuit 11 and applied to the gates of the SCR's 24 and 27 through the integrator capacitors 28 and 29. The anode of SCR 24 is connected through terminal 10 to one terminal of the exciter armature 6, and the anode of SCR 27 is connected through terminal 9 to the other terminal of the exciter armature 6. The exciter voltage 79 is represented in part (C) of FIG. 7 as a sinusoidal a-c wave, and the application of this voltage 79 to the anodes of SCR's 24, 27 causes them to alternately have a positive voltage applied thereto, such an alternation occurs with each half cycle. Consequently, the anode of either SCR 24 or 27 will be positive and begin to conduct whenever a pulse train 76 is received at its gate. The triggered SCR, 24 or 27, remains conductive until current flowing into its anode drops below a minimum "holding current" level, which is a characteristic of an SCR. A further characteristic is that a reversal in anode voltage polarity does not extinguish current flow, as long as the current remains in the direction of anode to cathode and also remains above the "holding" level.

The four SCR's 24-27 are connected to operate, or conduct, in pairs. For example, when SCR 24 conducts, the positive exciter voltage applied to its anode is applied to the gating diode 35, gating resistor 36, and the gate of SCR 26. Input terminal 9 of the current control circuit 11 is, at this time, at a negative potential, and therefore, the anode of SCR 26 is positive with respect to its cathode, causing it to conduct. In other words, when SCR 24 conducts SCR 26 also becomes conductive. SCR's 25 and 27 operate together in a similar manner, i.e., if the anode of SCR 27 is positive when a pulse train is received at trigger terminals 12, 13, it becomes conductive and simultaneously causes SCR 25 to become conductive.

When one pair of SCR's is conductive, the exciter armature 6 is connected to the alternator field winding with one electrical orientation, and when the other pair of SCR's conduct, the electrical connection is reversed, due to the nature of a bridge rectifier as composed of SCR's 24-27. In other words, not only is the polarity of the a-c exciter voltage applied to the input terminals 9 and 10 periodically changing every half cycle, but also the connection of the exciter voltage 79 to the alternator field winding 4 is periodically switched by the alternate conduction of the two pairs of SCR's. It is the timing of this change in circuit connection, between the exciter 6 and the alternator field 4, with respect to the change in exciter voltage polarity which provides a means of controlling the alternator field current.

To explain how this control is exercised, assume that the alternator output voltage is relatively low, as may occur when a heavy load has been suddenly applied to the alternator. Also assume, that the exciter voltage 79 is out of phase with the alternator output voltage to the degree that is indicated in part (C) of FIG. 7. [Compare part (A) with part (C) for this phase relationship] The purpose of this phase relationship is to obtain desired wave forms, and is accomplished by properly positioning the armatures 1, 6 and fields 4, 7 of the exciter and alternator within the apparatus. Testing has shown that the alternator voltage should, for at least one apparatus, lag the exciter voltage 79 by approximately 56° at no load. It was further found that this phase difference increased to about 79 degrees under load conditions. Further, assume that the positive half cycles in part (C) of FIG. 7 occur when the exciter armature 6 applies a positive voltage to the terminal 10. Now, in such a positive half cycle, the SCR's 24 and 26 will fire when a pulse train 76 is applied to the gate of the SCR 24, and a voltage will be applied to alternator field winding 4 which follows the curve 80 in part (D) of FIG. 7 commencing at a point 81. The curve 80 follows the envelope of the exciter voltage 79 until the SCR's 27, 25 fire, as at point 82 in part (D) of FIG. 7, and the voltage curve 80 then follows the inverse of the exciter voltage 79. It is seen from part (D) of FIG. 7 that the voltage applied to the alternator field 4 goes negative for a part of each half cycle, but this is not sufficient to reverse field current or alternator field flux. Rather, the predominant positive voltage periods build up the field current and flux to increase alternator output voltage. Regulation is thereby achieved.

Figure 7:
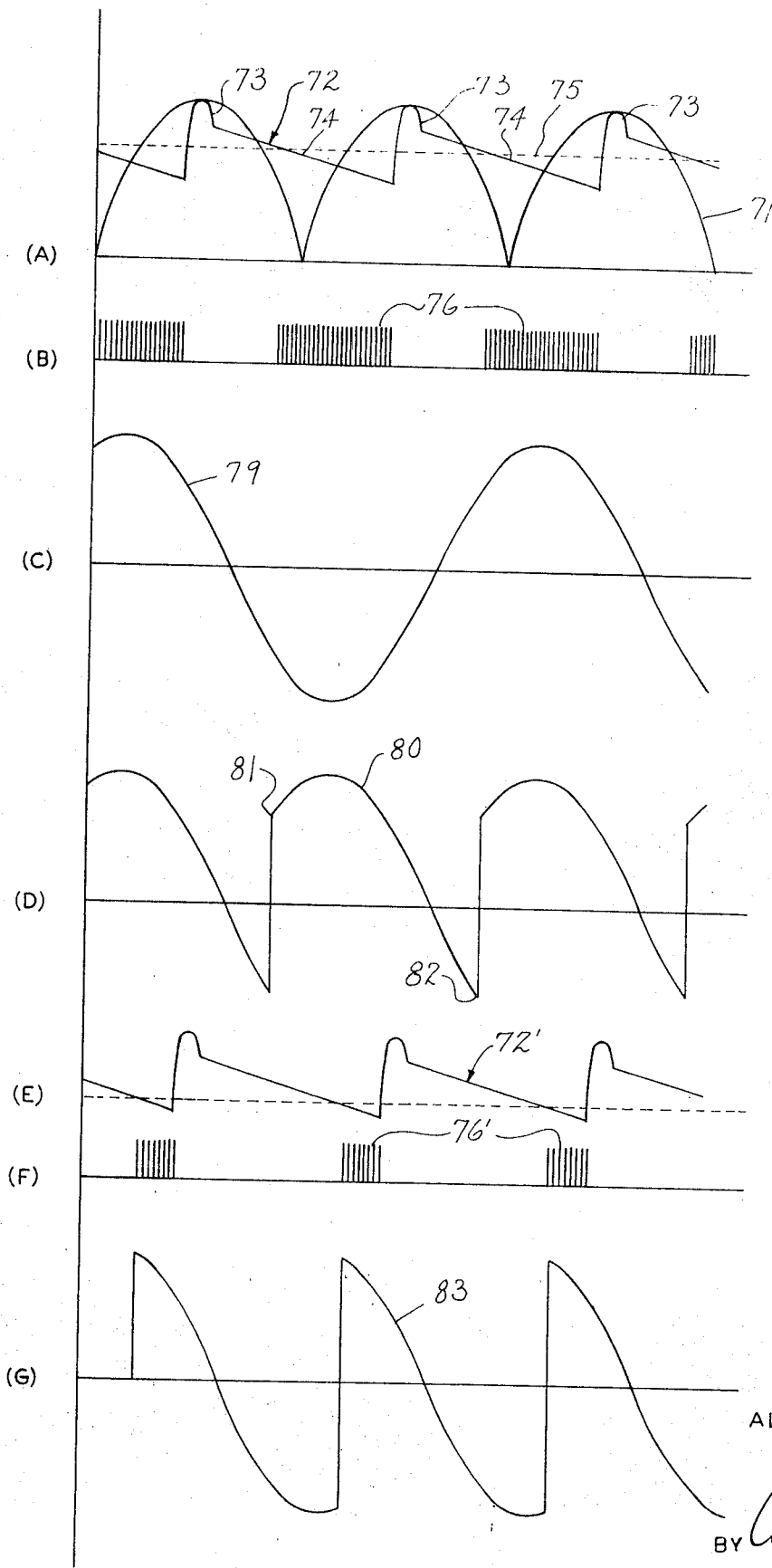
FIG. 7 is a collection of waveforms which appear in the circuit of FIG. 1.

Parts (E), (F) and (G) of FIG. 7 illustrate a condition in which alternator output voltage is high, and the command signal from the comparator circuit 16 calls for a decrease in alternator field current. Part (E) shows waveform 72' elevated with respect to reference voltage 75 so that the pulse trains 76', as shown in part (F), commence later in each half cycle than in part (B) of FIG. 7. As a result, the pair of SCR's 24, 26 and the pair of SCR's 27, 25 each fire later, with a resultant voltage 83 applied to the alternator field winding 4 as shown in part (G) of FIG. 7. This voltage 83 is predominantly negative with respect to the alternator field winding 4 to drive the field current to a lower value.

The termination of a pulse train 76, 76', is normally not determinative of the switching or operation of the SCR's 24-27, but by having the humps 73 on the waveform 72 rise above the reference voltage 75, the switching transistor 48 is periodically turned "on", and the pulse generator periodically turned "off" even when the ramp portion 74 of the waveform 72 is below the reference voltage 75 at all times. This eliminates modulation of the alternator output voltage.

The alternator output voltage at which the system of the invention stabilizes is determined by the relative magnitudes of the reference voltage 75 and the waveform 72 applied to the base of the switching transistor 48 in the comparator circuit 16. By moving the slider 47 on the potentiometer 45, the resistance between the summing point 46 and the rectifier output terminal 41 is altered to control the magnitude of the waveform 72 applied to the base of switching transistor 48. By decreasing this resistance a higher alternator output voltage must be applied to the comparator input terminals 17 and 18 to produce a stable alternator field current. Conversely, increasing the resistance across the potentiometer 45 causes the system to stabilize at a lower alternator output voltage.

The regulation of the feedback control system is determined generally by the slope of the ramp 74 on the waveform 72. When filter capacitor 43 is large, this slope is small, and slight variations in alternator output voltage produce relatively large variations in the timing of the pulse trains 76. In other words, slight variations in the alternator output voltage cause relatively extreme corrections in alternator field current to correct the variations in the alternator output voltage. Conversely, regulation is desensitized by using a smaller filter capacitor 43 which produces a steeper ramp 74 on the waveform 72.

The system responds very rapidly to changes in the alternator output voltage. The response of the comparator circuit 16, transceiver 22, and current control circuit 11 is virtually instantaneous when compared to the time constants of the exciter and alternator. The invention dispenses with the exciter time constant by excluding it from the feedback control system, leaving only the inherent time constant of the alternator as a limit on the response of the system. This improved feedback control is obtained with little additional expense.

The alternator field current is directly controlled by the alternator output voltage. This control includes the ability to rapidly increase field current by applying a substantially positive full-wave rectified exciter voltage to the field winding. This control also includes the ability to force a decrease in field current. This latter feature called "negative field forcing" accelerates the collapse of the magnetic field produced by the field winding and causes a rapid drop in alternator output voltage. Negative field forcing occurs when the alternator output voltage rises sufficiently to produce a waveform like that of waveform 72' in part (E) of FIG. 7, at the base of switching transistor 48. The resulting pulse train 76' triggers the SCR's 24-27 to produce the voltage waveform 83 at the output of the current control circuit 11. The waveform 83 is substantially negative in polarity, or in other words, it substantially opposes the flow of alternator field current to cause a rapid drop in alternator output voltage.

I claim:
1. A feedback controlled alternator system, which comprises:
   an alternator having a field winding adapted for rotation, and a stationary armature which generates an output voltage having a magnitude determined by the magnitude of current flowing in the rotatable field winding;

an exciter having an armature attached to rotate with the alternator field winding and generate an exciter armature voltage;

a current control circuit attached to rotate with the alternator field winding and exciter armature, connected to receive the exciter armature voltage, and adapted to maintain the alternator output voltage at a predetermined level by controlling the magnitude of the alternator field current in response to a command signal;

a comparator circuit connected to sense magnitude variations in the alternator output voltage, and generate a command signal in the form of voltage pulse trains, the phase of which contain the information necessary to maintain the alternator output voltage at a predetermined level; and a transceiver connected to receive the command signal from the comparator circuit and transmit it to the rotating current control circuit.

2. The feedback controlled alternator system as recited in claim 1, wherein the current control circuit includes four semiconductor controlled rectifiers connected in a full-wave bridge rectifier configuration, which rectifiers are operative in pairs in response to the command signal to alternately reverse the connection of the exciter armature to the alternator field winding.

3. The feedback controlled alternator system as recited in claim 2, wherein the command signal is received at the gate of a first semiconductor controlled rectifier in each pair, and the cathode of the first semiconductor controlled rectifier in each pair is connected to the gate of the second semiconductor controlled rectifier of the pair, such that when the first semiconductor controlled rectifier in each pair is triggered into conduction by the command signal, the attached second semiconductor controlled rectifier of the pair is also triggered into conduction.

4. A feedback controlled alternator system, which comprises:

an alternator having a field winding adapted for rotation and a stationary armature which generates an output voltage having a magnitude determined by the magnitude of current flowing in the rotatable field winding;

an exciter adapted to generate an exciter armature voltage;

a current control circuit attached to rotate with the alternator field winding, connected to receive the exciter armature voltage, and adapted to maintain the alternator output voltage at a predetermined level by controlling the magnitude of the alternator field current in response to a command signal;

a comparator circuit connected to sense variations in the alternator output voltage and generate a command signal; and a transceiver having a primary winding connected to receive the command signal from the comparator circuit, and a secondary winding attached to rotate with the current control circuit, wherein the secondary winding is magnetically linked with the primary winding to receive the command signal and electrically connected to convey the command signal to the current control circuit, wherein both the primary and secondary windings in the transceiver are wound around, and concentric with, the axis of rotation of the secondary winding.

5. The feedback controlled alternator system of claim 4, wherein the primary and secondary windings of the transceiver are each wound in a separate plane perpendicular to the secondary winding axis of rotation and each spirals about the axis of rotation.

6. A feedback controlled alternator system which comprises:

an alternator having a field winding and armature which generates an output voltage having a magnitude determined by the magnitude of current flowing in the field winding;

an exciter adapted to generate an exciter armature voltage;

a current control circuit connected to receive the exciter armature voltage and connected to maintain the alternator output voltage at a predetermined level by controlling the magnitude of the alternator field current in response to a command signal; and a comparator circuit which includes an electronic switch connected to receive and sense the magnitude of the alternator output voltage, and adapted to actuate a pulse generator in response to the amplitude of the alternator output voltage, and deactuate the pulse generator in synchronism with the alternator output voltage to produce a command signal comprised of pulse trains for the current control circuit, wherein the phase angle of the pulse trains in the command signal with respect to the alternator output voltage contains the information necessary to regulate the alternator output voltage.

7. The feedback controlled alternator of claim 6, wherein the electronic switch includes:

a switching transistor connected to actuate and deactuate the pulse generator;

a full-wave rectifier unit connected to receive the alternator output voltage and generate an output signal to a summing point;

a filter connected to filter the rectifier output signal applied to the summing point, comprised of a filter resistor in series with a filter capacitor; and a reference voltage source connected to oppose the rectifier output signal applied to the summing point, resulting in a difference signal which is applied to the switching transistor.

8. A feedback controlled alternator system, which comprises:

an alternator having a rotatable field winding and a stationary armature in which is generated an output voltage dependent upon the magnitude of field winding current;

an exciter having a rotatable armature mounted to rotate with said alternator field winding in which is generated an exciter voltage;

a current control circuit mounted to rotate with said alternator field winding and said exciter armature;

input connections for said current control circuit to receive the exciter voltage and a command signal comprised of voltage pulse trains;

output connections for said current control circuit connected to said rotatable field winding to conduct current thereto of a value governed by the phase of the pulse trains in the command signal;

a stationary comparator circuit having an input connected to the alternator armature and adapted to generate a command signal responsive to the alternator output voltage; and a transceiver connected between said comparator circuit and said current control circuit to receive the command signal from the stationary comparator circuit and transmit it to the rotatable current control circuit.

9. A feedback control system for an alternator having field and armature windings, which system comprises:

a comparator circuit having an input for receiving alternator armature voltage, and a command signal generator that commences and discontinues the generation of voltage pulse trains in response to the amplitude of the alternator armature voltage;

an a-c exciter; and a current control circuit having rectifier elements connected to an alternator field winding, gating control for the rectifier elements that receives the command signal of said comparator circuit, and input connections for receiving an a-c exciter voltage and applying the same to said rectifier elements, thereby applying the exciter voltage through the rectifier elements to the alternator field winding in response to the phase angle of the voltage pulses in said command signal applied to said gating control.

10. A system as in claim 9 wherein the comparator circuit has a rectifier for rectifying alternator armature voltage, a switching element for controlling said command signal generator, circuit elements for applying rectified alternator armature voltage to said switching element, and wherein said command signal generator develops pulses of frequency greater than the frequency of said alternator armature voltage, which pulses are delivered in intermittent trains commencing at a time dependent upon operation of said switching element.

11. A system as in claim 9 wherein the current control circuit has rectifier elements that continue to conduct until current falls to a threshold value, and reverse voltages from the exciter are applied to the alternator field windings.

* * * * *